US008750198B2

(12) United States Patent
Cho et al.

(10) Patent No.: US 8,750,198 B2
(45) Date of Patent: Jun. 10, 2014

(54) METHOD AND APPARATUS OF REQUIRING UPLINK RESOURCE AND HANDOVER IN WIRELESS COMMUNICATION SYSTEM INCLUDING RELAY STATIONS

(75) Inventors: Hee Jeong Cho, Anyang-si (KR); Young Soo Yuk, Anyang-si (KR); In Uk Jung, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 13/388,380

(22) PCT Filed: Aug. 24, 2010

(86) PCT No.: PCT/KR2010/005638
§ 371 (c)(1),
(2), (4) Date: Feb. 1, 2012

(87) PCT Pub. No.: WO2011/025221
PCT Pub. Date: Mar. 3, 2011

(65) Prior Publication Data
US 2012/0127919 A1    May 24, 2012

Related U.S. Application Data

(60) Provisional application No. 61/236,158, filed on Aug. 24, 2009, provisional application No. 61/236,864, filed on Aug. 25, 2009, provisional application No. 61/241,383, filed on Sep. 10, 2009.

(30) Foreign Application Priority Data

Aug. 24, 2010  (KR) .................. 10-2010-0081935

(51) Int. Cl.
*H04B 7/14* (2006.01)
*H04W 88/04* (2009.01)
*H04W 36/00* (2009.01)
*H04W 36/14* (2009.01)
*H04W 36/08* (2009.01)

(52) U.S. Cl.
CPC .......... *H04W 88/04* (2013.01); *H04W 36/0011* (2013.01); *H04W 36/14* (2013.01); *H04W 36/08* (2013.01)
USPC ............ 370/315; 370/329; 370/331; 455/436

(58) Field of Classification Search
CPC ...................................... H04W 88/04
USPC ................ 370/329, 331, 341, 352–357, 315; 455/436–444, 450–509
See application file for complete search history.

(56) References Cited

U.S. PATENT DOCUMENTS

2006/0079233 A1 *  4/2006  Watanabe et al. ............. 455/436
2008/0056174 A1    3/2008  Jung et al.
(Continued)

FOREIGN PATENT DOCUMENTS

KR   10-2007-0061253 A    6/2007
KR   10-2008-0043682 A    5/2008
KR   10-2008-0078983 A    8/2008

OTHER PUBLICATIONS

International Search Report mailed May 16, 2011 for PCT/KR2010/005638.

*Primary Examiner* — Mark Rinehart
*Assistant Examiner* — Mang Yeung
(74) *Attorney, Agent, or Firm* — Morgan, Lewis & Bockius LLP (57) ABSTRACT

A method of requiring uplink resource and handover in a wireless communication system including relay stations is disclosed. The present invention includes transmitting request for uplink resource allocation to a relay station and receiving a message indicating the relay station cannot allocate an uplink resource to the mobile station within a period for which the mobile station waits for a response, from the relay station.

10 Claims, 4 Drawing Sheets

(56) References Cited

U.S. PATENT DOCUMENTS

| | | | |
|---|---|---|---|
| 2008/0117854 A1* | 5/2008 | Saifullah et al. | 370/315 |
| 2008/0207214 A1 | 8/2008 | Han et al. | |
| 2009/0201798 A1* | 8/2009 | Lee et al. | 370/216 |
| 2010/0061339 A1 | 3/2010 | Kim et al. | |
| 2010/0238859 A1* | 9/2010 | Vukovic et al. | 370/328 |

* cited by examiner

METHOD AND APPARATUS OF REQUIRING UPLINK RESOURCE AND HANDOVER IN WIRELESS COMMUNICATION SYSTEM INCLUDING RELAY STATIONS

This is a U.S. National Phase Entry of PCT Application No. PCT/KR2010/005638, filed Aug. 24, 2010, and claims the benefit of Korean Patent Application No. 10-2010-0081935filed Aug. 24, 2010 and claims the benefit of U.S. Provisional Application Nos. 61/241,383 filed Sep. 10, 2009; 61/236,864 filed Aug. 25, 2009 and 61/236,158 filed Aug. 24, 2009.

TECHNICAL FIELD

The present invention relates to a wireless mobile communication system, and more particularly, to a method of requiring uplink resource and handover in a wireless communication system including relay stations.

BACKGROUND ART

Generally, since signal transceiving is performed via a direct link between a fixed base station and a mobile station in a wireless communication system, it is facilitated to configure a highly-reliable wireless communication link between a base station and a mobile station. Yet, since a location of a base station may be fixed in a wireless communication system, a wireless network configuration is less flexible. Moreover, in a wireless environment having a considerable fluctuation of traffic distribution or call demand level, it is difficult to provide an efficient communication service. In order to overcome these disadvantages, it is able to apply a multi-hop type data transfer scheme to a general cellular wireless communication system using a fixed relay station, a mobile relay station or general mobile stations.

Figure 1:
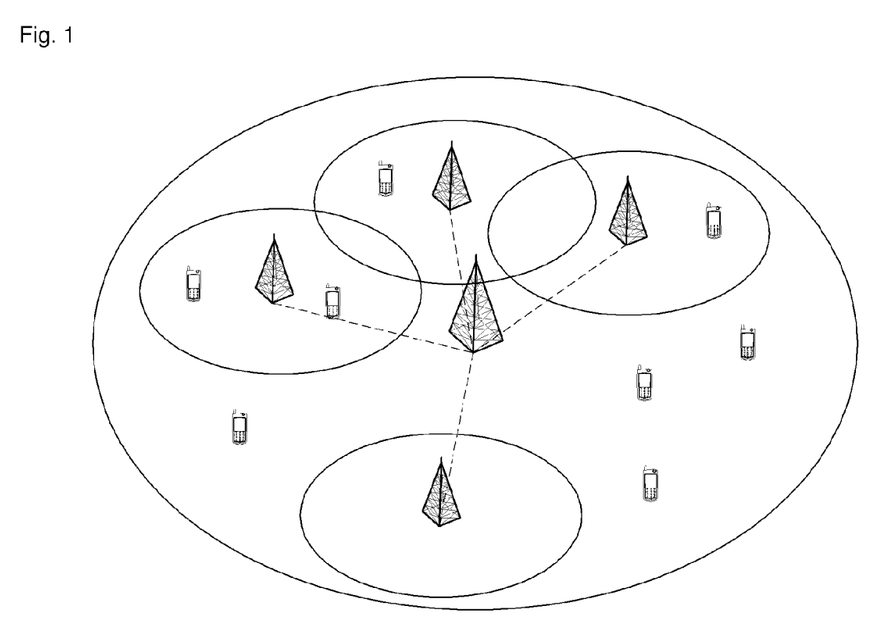
FIG. 1 is an illustrating diagram of network which performs the wireless communication using the relay station.

FIG. 1 is an illustrating diagram of network which performs the wireless communication using the relay station.

Referring to FIG. 1, a wireless communication system, which adopts a multi-hope relay scheme, is able to reconfigure a network to promptly cope with a communication environment change and is also able to operate and manage an overall wireless network more efficiently.

For instance, a wireless communication system, which adopts a multi-hop relay station scheme, extends a cell service area and increases a system capacity. In particular, if a channel status between a base station and a mobile station is poor, it is able to provide mobile station with a wireless channel having a better channel status by configuring a multi-hop relay station path via a relay station by establishing the relay station between the base station and the mobile station. Moreover, by applying a multi-hop relay station scheme to a cell boundary area having a poor channel status from a base station, it is able to provide a faster data channel and it is also able to extend a cell service area.

A relay station is the technology introduced for eliminating a radio wave shadow area in a mobile communication system and is widely used. Compared to an old system which is limited to a repeater function of transmitting a signal by simply amplifying the signal, a current system has evolved into a more intelligent system.

Moreover, a relay station technology is mandatory for a next generation communication system to reduce a cost for an extension of base station installations and a maintenance cost of a backhaul network and is also mandatory for a service coverage enlargement and a data processing rate improvement.

Figure 2:
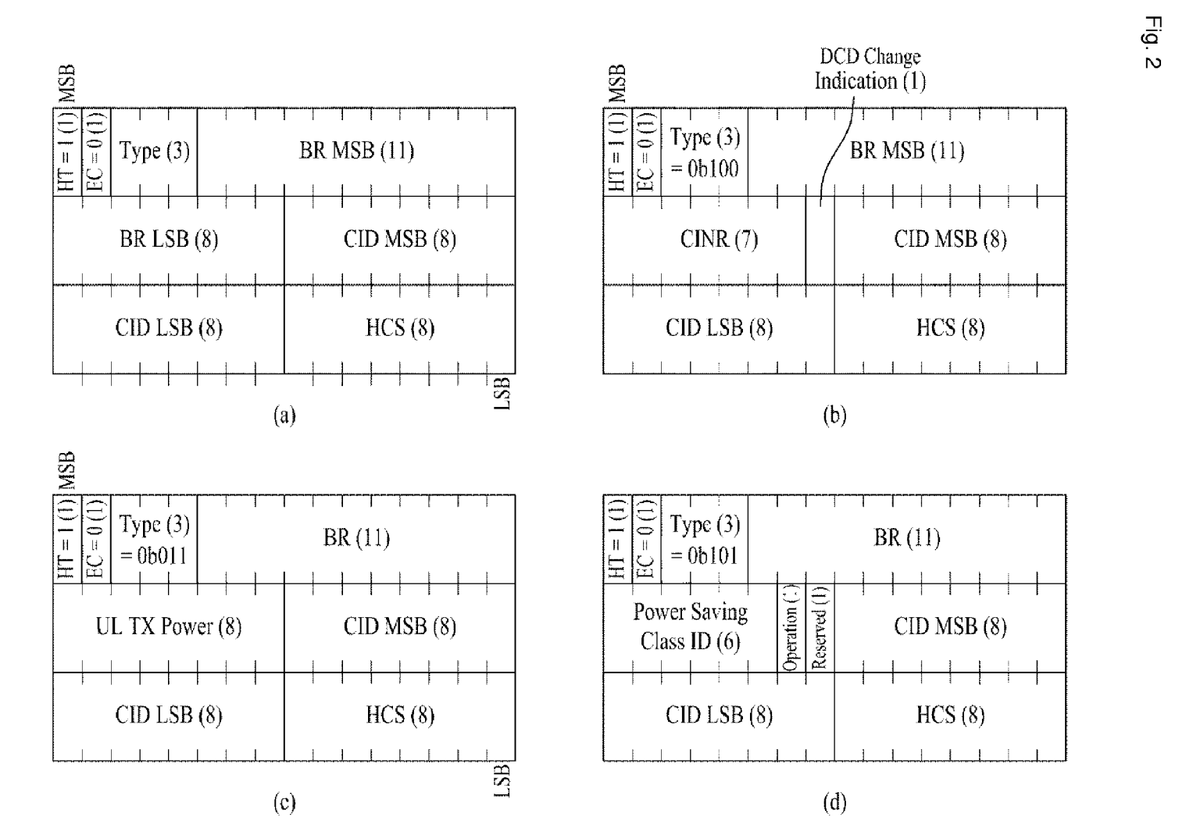
FIG. 2 illustrates signaling headers which a mobile station transmits to request uplink resources.

Next, a method of requiring uplink resources of a mobile station belonging to a relay station according to a related art is explained referring to FIG. 2. According to a related art, a mobile station belonging to a relay station requires uplink resources in the same way as a mobile station belonging to a base station.

OFDM physical layer specifies ranging subchannel and ranging code used for contention based bandwidth request. A mobile station selects a ranging code among a subset of ranging codes for bandwidth request to request bandwidth. A mobile station modulates the selected range code on the ranging subchannel and transmits it during a slot selected randomly from ranging area of a frame.

A base station detecting a ranging code allocates resources to a mobile station using CDMA allocation information element (IE) and connention identifier (CID), wherein the CDMA allocation IE specifies the ranging code the mobile station transmitted and transmission area in which the ranging code was transmitted. The mobile station transmits a signaling header or a grant management subheader, wherein the signaling header and the grant management subheader are includes bandwidth a request header and a bandwidth request field.

FIG. 2 illustrates signaling headers which a mobile station transmits to request uplink resources. FIGS. 2(*a*) illustrates a signaling header for bandwidth request, 2(*b*) illustrates a signaling header for bandwidth request and CINR report, 2(*c*) illustrates a signaling header for bandwidth request and uplink transmission power report, and 2(*d*) illustrates a signaling header for bandwidth request and uplink sleep control. Table 1 shows a grant management sub_header.

TABLE 1

| Name | Length (bit) | Description |
| --- | --- | --- |
| FLI | 1 | Frame latency indication<br>0 = FL field disabled for this grant<br>1 = FL field enabled for this grant |
| FL | 4 | Frame latency. The number of frames previous to the current one in which the transmitted data was available. When the latency is greater than 15 then the FL field shall be set to 15. |
| Extended Piggyback Request | 11 | The number of bytes of UL bandwidth requested by the MS. The BR is for the CID. The request shall not include any PHY overhead. In case of Extended rtPS, the BS changes its grant size to the size specified in this field. |
| PBR | 16 | Piggyback request. The number of bytes of UL bandwidth requested by the SS. The BR is for the CID. The request shall not include any PHY overhead. The request shall be incremental. |

TABLE 1-continued

| Name | Length (bit) | Description |
|---|---|---|
| PM | 1 | Poll me 0 = No action 1 = Used by the SS to request a bandwidth poll. |
| Reserved | 9 | — |
| SI | 1 | Slip indicator 0 = No action 1 = Used by the SS to indicate a slip of UL grants relative to the UL queue depth. |

Or, a mobile station can transmits data through allocated resources.

According to a related art, in case that a relay station cannot be allocated uplink resource from a base station or a super relay station (super-RS) and its buffer is full when receiving uplink resources request from a sub-relay station (Sub-RS) or a mobile station, it cannot allocates resources to the Sub-RS or the mobile station within a period for which the mobile station waits for a response.

Then, if the mobile station does not be allocated uplink resources within the period, it retransmits an uplink resources request to the relay station. Thus, uplink signaling overhead is increased because of the retransmission of the uplink resources request.

A mobile station transmits a ranging request message including a base station identifier (BSID) of a serving base station to a target base station during handover procedure. So, a mobile station belonging to a relay station includes a BSID or a relay station identifier (RSID) in a ranging request message. A mobile station must know a BSID to include a BSID in a ranging request message. Or, when a mobile station includes a RSID in a ranging request message, a target base station have to know that an ID in a ranging request message is a RSID.

DISCLOSURE OF INVENTION

Technical Problem

As mentioned in the foregoing description of the related art, signaling overhead is increased during resource request procedure according to a related art. And a mobile station must know a BSID to transmit a BSID. Or when a mobile station transmits a RSID, a relay station must know that an ID in a ranging request message is a RSID.

Solution to Problem

Accordingly, the present invention is directed to a method of requiring uplink resource and handover in a wireless communication system including relay stations that substantially obviates one or more of the problems due to limitations and disadvantages of the related art.

An object of the present invention is to provide a method of a method of requiring uplink resource, by which signaling overhead is reduced.

An object of the present invention is to provide a method of handover of a mobile station belonging to a relay station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of requiring uplink resource at a mobile station in a wireless communication system including relay stations includes the steps of transmitting request for uplink resource allocation to a relay station and receiving a message indicating the relay station cannot allocate a uplink resource to the mobile station within a period for which the mobile station waits for a response, from the relay station.

Preferably, the message includes information about a time at which the relay station can allocates the uplink resource to the mobile station.

More preferably, the mobile station retransmits the request for uplink resource allocation to the relay station if the mobile station does not receive resource allocation information until the time.

To further achieve these and other advantages and in accordance with the purpose of the present invention, a method of allocating uplink resource at a relay station in a wireless communication system including relay stations includes the steps of receiving request for uplink resource allocation from a mobile station and transmitting, to the mobile station, a message indicating the relay station cannot allocate a uplink resource to the mobile station within a period for which the mobile station waits for a response, if the relay station connot allocate the uplink resource to the mobile station within the period.

Preferably, the message includes information about a time at which the relay station can allocates the uplink resource to the mobile station.

To further achieve these and other advantages and in accordance with the purpose of the present invention, a mobile station in a wireless communication system includes a transmitting module transmitting request for uplink resource allocation to a relay station and a receiving module receiving a message indicating the relay station cannot allocate a uplink resource to the mobile station within a period for which the mobile station waits for a response, from the relay station.

Preferably, the message includes information about a time at which the relay station can allocates the uplink resource to the mobile station.

More preferably, the mobile station retransmits the request for uplink resource allocation to the relay station if the mobile station does not receive resource allocation information until the time.

To further achieve these and other advantages and in accordance with the purpose of the present invention, a relay station in a wireless communication system includes a receiving module receiving request for uplink resource allocation from a mobile station and a transmitting module transmitting, to the mobile station, a message indicating the relay station cannot allocate a uplink resource to the mobile station within a period for which the mobile station waits for a response, if the relay station connot allocate the uplink resource to the mobile station within the period.

Preferably, the message includes information about a time at which the relay station can allocates the uplink resource to the mobile station.

To further achieve these and other advantages and in accordance with the purpose of the present invention, a method of handover at mobile station in a wireless communication system including relay stations includes steps of receiving a RSID (relay station identifier) of a relay station from the relay station and transmitting a message including the RSID and an indication indicating whether ID the mobile station transmits is a RSID or a BSID (base station identifier).

Preferably, the message is a ranging request message and the indication is a ranging purpose indication.

To further achieve these and other advantages and in accordance with the purpose of the present invention, a mobile station in a wireless communication system including relay stations includes a receiving module receiving a RSID (relay station identifier) of a relay station from the relay station and a transmitting module transmitting a message including the RSID and an indication indicating whether ID the mobile station transmits is a RSID or a BSID (base station identifier).

Preferably, the message is a ranging request message and the indication is a ranging purpose indication.

It is to be understood that both the foregoing general description and the following detailed description are exemplary and explanatory and are intended to provide further explanation of the invention as claimed.

Advantageous Effects of Invention

According to embodiments of the present invention, a relay station transmits a message indicating the relay station cannot allocate an uplink resource to the mobile station within a period for which the mobile station waits for a response to the mobile station if it cannot allocate the uplink resource to the mobile station within the period.

Therefore, the present invention is able to reduce signaling overhead.

And, the present invention provides a method of handover of a mobile station belonging to a relay station.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

First of all, bandwidth request procedures for scheduling modes in a wireless communication system including relay stations are described. There are a centralized scheduling mode and a distributed scheduling mode in scheduling modes.

In a centralized scheduling mode, a relay station receiving bandwidth requests from mobile stations does not aggregate requested bandwidth and transmits information of the received bandwidth requests to a base station. At this time, the information of the received bandwidth requests can include bandwidth request headers or a number of bandwidth request codes received in a frame.

A relay station requests resources for transmitting the information of the received bandwidth requests to a base station. At this time, if the relay station has available resources, it can transmit the information of the received bandwidth requests using the available resources. If the relay station does not have available resources, it can transmit a bandwidth request code or a dedicated code to request resources.

If a non-transparent relay station receives CDMA codes from mobile stations, it transmits an index of a frame in which the CDMA codes are received and a number of the CDMA codes received in the frame through MR Code report header (MR Code REP header) to a base station.

The base station transmits CDMA allocation information elements (CDMA allocation IE) as many as the received CDMA codes to the relay station. A CDMA code reception time field and a CDME code index field of the CDMA allocation IEs are filled with 0.

Then, the relay station fills the CDMA code reception time field and the CDME code index field and transmits the CDMA allocation IEs to mobile stations.

If a transparent relay station receives CDMA codes from mobile stations, it transmits an index of a frame in which the CDMA codes are received, indexes of the CDMA codes received in the frame and information of the CDMA code through MR ranging report message (MR RNG REP message) to a base station. The base station transmits CDMA allocation IEs to the relay station and the relay station forwards the CDMA allocation IEs to the mobile stations.

And, in a centralized scheduling mode, a base station scheduling information of all links according to process delay and link quality through a RS access MAP.

Figure 3:
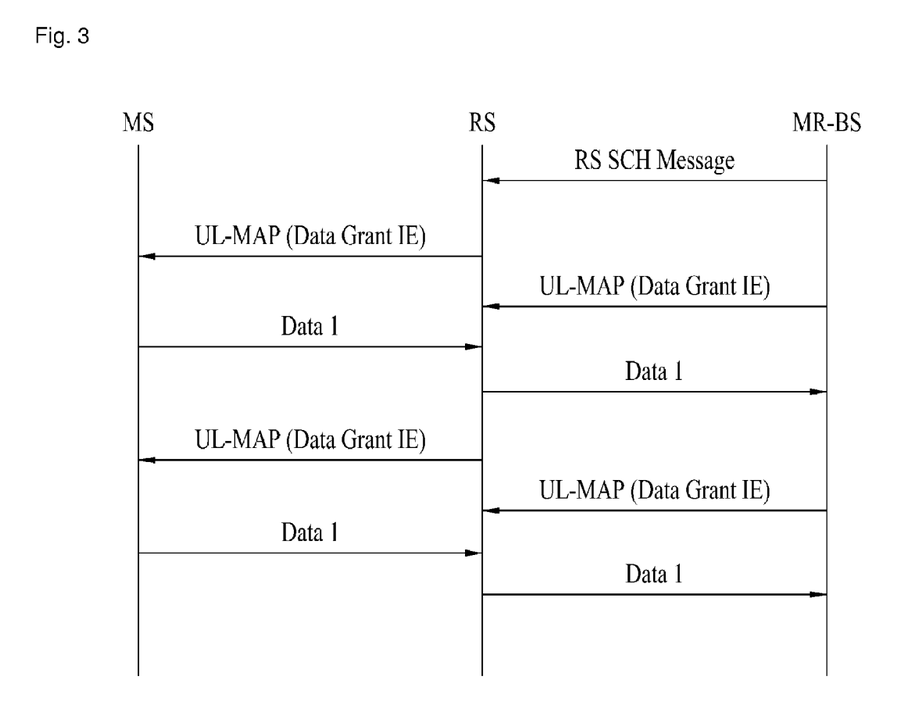
FIG. 3 illustrates a bandwidth request procedure in a distributed scheduling mode.

A bandwidth request procedure in a distributed scheduling mode is described with reference to FIG. 3. FIG. 3 illustrates a bandwidth request procedure in a distributed scheduling mode.

A relay station receiving bandwidth requests from mobile stations aggregates requested bandwidth for each of quality of service (QoS) classes. And it requests uplink resources to a base station using a signaling header, piggybacking, a CDMA bandwidth request code or a dedicated code.

The base station informs the relay station of grant time through a relay station supplemental channel (RS SCH) message. And, the base station informs the relay station of resource allocation information through an uplink MAP (UL-MAP) at the grant time.

Then, the relay station determines resource allocation time and resource allocation amount and allocates resources to the mobile stations.

As illustrated in FIG. 3, the relay station receives scheduling information through a RS SCH message from a base station, and allocates resources to the mobile stations using the scheduling information. And, it receives data from mobile stations and transmits the received data to the base station.

in case that a relay station receives a uplink resource request from a mobile station or sub relay station (Sub-RS) and is not allocated resource by a base station of a super relay station (super-RS) and its buffer is full, it cannot allocate an uplink resource to the mobile station of sub-RS within a period for which the mobile station or sub-RS waits for a response to the mobile station. The mobile station or the sub-RS does not be allocated uplink resources within the period, it retransmits an uplink resources request to the relay station. Thus, uplink signaling overhead is increased because of the retransmission of the uplink resources request.

In first embodiment of the present invention, two methods to solve above described problem will be provided.

According to first method, when a relay station receive uplink resource allocation request from a mobile station and con not allocate an uplink resource to the mobile station within a period for which the mobile station waits for a response, it inform a mobile station that it cannot allocate an uplink resource to the mobile station within the period. At this time, it can inform the mobile station of information about a time at which the relay station can allocates the uplink resource to the mobile station.

After transmitting an uplink resource request to a relay station, a mobile station starts a timer and retransmits the uplink resource request when the timer terminates. However, if a mobile station receives a message indicating that a relay station cannot allocate an uplink resource to the mobile station within a period for which the mobile station waits for a response, it does not retransmit the uplink resource request when the timer terminates.

If a mobile station receives information about a time at which a relay station can allocates the uplink resource to the mobile station, it retransmits the uplink resource request when it is not allocated resource by the relay station until the time at which a relay station can allocates the uplink resource to the mobile station.

A relay station can inform a base station or a super relay station of its buffer information when requesting uplink resource. For example, in case that buffer information is expressed with 2 bits, 0b00 represents that below ¼ of buffer remains; 0b01 represents that above ¼ and below 2/4 of buffer remains; 0b10 represents that above 2/4 and below ¾ of buffer remains and 0b11 represents that above ¾ of buffer remains.

According to second method, a base station allocates uplink resource to a relay station at regular intervals. The relay station uses the allocated resource only for uplink resource request. The interval can be determined during initial network entry. Or it can be determined through special signaling when a relay station wants.

The special signaling can be a codeword of a fast feedback channel or a message. Or, a relay station can set a polling request indicator when requesting uplink resource.

The allocated resource can be released by a base station or a relay station.

If resource is insufficient, a base station or a super relay station can release the allocated resource and inform of a relay station of release of the allocated resource.

A relay station releases resource if there is no mobile station belonging to it.

Next, a method of handover in a wireless communication system including relay stations according to second embodiment of the present invention will be described.

When a mobile station performs handover from a serving base station to a target base station, it transmits a ranging request message including a BSID of the serving base station.

When a mobile station belonging to a relay station performs handover to a target base station, it can transmits a BSID or/and a relay station identifier (RSID) to the target base station.

In case that a mobile station transmits a BSID to the target base station, it must know a BSID.

A base station transmits its BSID to a relay station through a super frame header (SFH) and a MAC management message. At this time, the MAC management massage can be transmitted as unicast or multicase. And a base station allocates a RSID to a relay station through a MAC management message.

A method that a relay station transmits a BSID and a RSID to a mobile station will be described. A relay station can transmit a BSID to a mobile station through a secondary-SFH (S-SFH) or a unicast management message transmitted during network entry, handover or scanning. There are a ranging response (RNG-RSP) message, a registration response (REG-RSP) message and so on in the unicast management message transmitted during network entry. There are a handover request (HO-REQ) message, a handover indication (HO-IND) message and a handover command (HO-CMD) message in unicast management message transmitted during handover. There are a scanning request (SCN-REQ) message, a scanning response (SCN-RSP) message, a report request (REP-REQ) message and a report response (REP-RSP) message in unicast management message transmitted during scanning.

And a relay station can transmit a RSID to a mobile station through a S-SFH or a unicast management message transmitted during network entry or handover.

Table 2 shows methods that a relay station transmits a BSID and a RSID to a mobile station.

TABLE 2

|  | BS ID | RS ID |
|---|---|---|
| Method 1 | S-SFH sent by ARS | S-SFH sent by ARS |
| Method 2 | Unicast management message sent by ARS during the network entry (e.g., RNG-RSP, REG-RSP and so on) | S-SFH sent by ARS |
| Method 3 | S-SFH sent by ARS | Unicast management message sent by ARS during the network entry (e.g., RNG-RSP, REG-RSP and so on) |
| Method 4 | Unicast management message sent by ARS during the handover or scanning procedure (e.g., HO-REQ/IND/CMD, SCN-REQ/RSP, REP-REQ/RSP and so on) | S-SFH sent by ARS |
| Method 5 | S-SFH sent by ARS | Unicast management message sent by ARS during the handover procedure (e.g., HO-REQ/IND/CMD and so on) |
| Method 6 | No transmission | Method 1, 3 or 5 |

A BSID and a RSID is transmitted through a S-SFH in method 1. A BSID is transmitted through a unicast management message transmitted during network entry and a RSID is transmitted through a S-SFH in method 2. A BSID is transmitted through a S-SFH and a RSID is transmitted through a unicast management message transmitted during network entry in method 3. A BSID is transmitted through a unicast management message transmitted during handover or scanning and a RSID is transmitted through a S-SFH in method 4. A BSID is transmitted through a S-SFH and a RSID is transmitted through a unicast management message transmitted during handover in method 5. A BSID is not transmitted and a RSID is transmitted through S-SFH or a unicast management message during network entry or handover in method 6.

In case that a mobile station transmits a BSID to a target base station, it transmits the BSID to the target base station wherein the BSID is received through a S-SFH or a unicast management message transmitted during network entry, handover or scanning from a relay station.

In case that a mobile station transmits a RSID to a target base station, it transmits the RSID to the target base station wherein the RSID is received through a S-SFH or a unicast management message transmitted during network entry or handover from a relay station.

Then, a target base station must know whether the received ID is a RSID or a BSID. That is, in case that a system set for a mobile station in a relay station to transmit a RSID to a target base station, a mobile station in a relay station transmits a RSID to a target base station and a mobile station in a macro base station transmits a BSID to a target base station. Therefore, a target base station must know whether the received ID is a RSID or a BSID.

Thus a mobile station must transmit, to a target base station, an indicator indicating whether the ID the mobile station transmits is a RSID or a BSID. At this time, a mobile station can use a ranging purpose indicator of a ranging request message as the indicator indicating whether the ID the mobile station transmits is a RSID or a BSID. A specific value of the ranging purpose indicator can represent that a mobile station performs handover from a relay station.

If the indicator indicating whether the ID the mobile station transmits is a RSID or a BSID is set to represent that the ID is a RSID, a target base station recognizes that the ID is a RSID.

Figure 4:
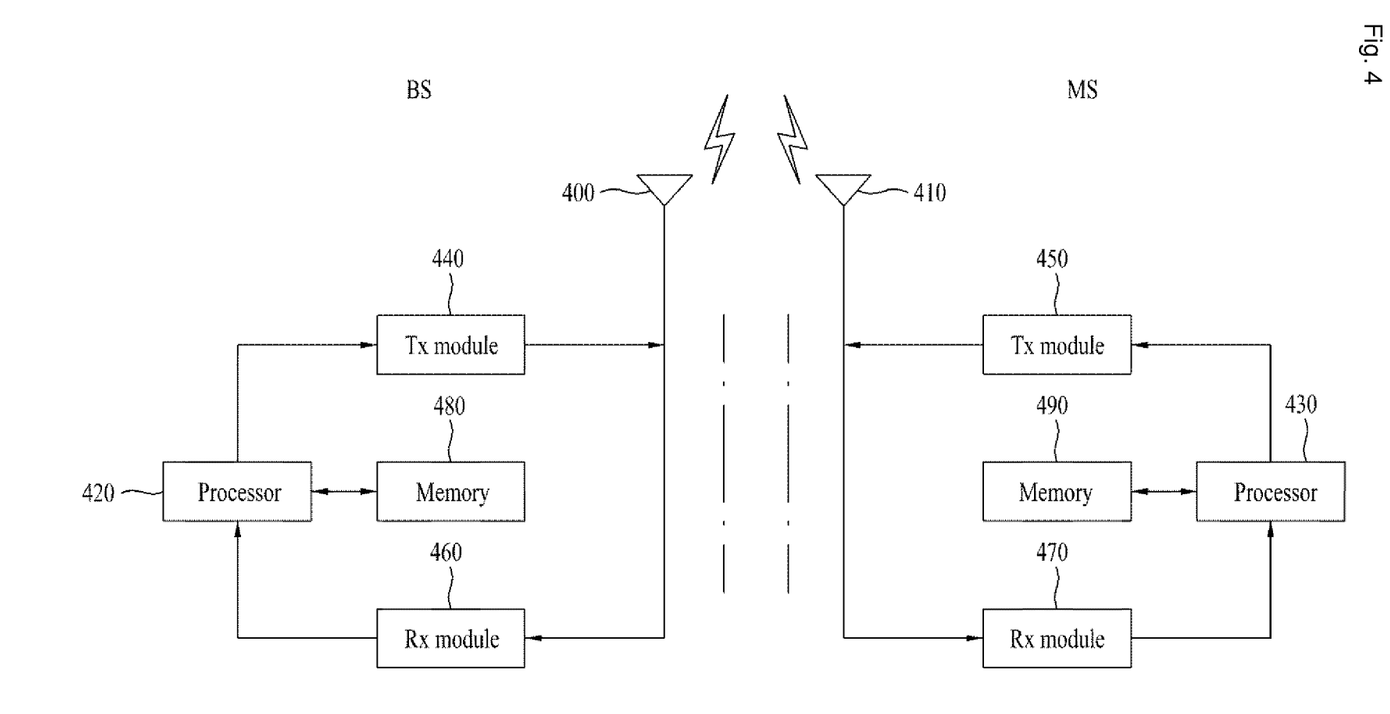
FIG. 4 is a diagram for configurations of mobile and base stations, in which embodiments of the present invention are implemented.

FIG. 4 is a diagram for configurations of mobile and base stations, in which embodiments of the present invention are implemented.

Referring to FIG. 4, a mobile station (AMS)/base station (ABS) includes an antenna 400/410 capable of transmitting and receiving information, data, signals and/or messages and the like, a transmitting module (Tx module) 440/450 transmitting a message by controlling the antenna, a receiving module (Rx module) 460/470 receiving a message by controlling the antenna 400/410, a memory 480/490 configured to store information relevant to communications with a base station, and a processor 420/430 controlling the transmitting module, the receiving module and the memory. In this case, the base station can include a femto base station or a macro base station.

The antenna 400/410 externally transmits a signal generated from the transmitting module 440/450. And, the antenna 400/410 receives a radio signal from outside and then delivers the received radio signal to the receiving module 460/470. In case that a multiple-antenna (MIMO) function is supported, at least two antennas can be provided to the mobile station or the base station.

The processor 420/430 generally controls overall operations of the mobile/base station. In particular, the processor 420/430 is able to perform a control function for performing the above-described embodiments of the present invention, a MAC (medium access control) frame variable control function according to service characteristics and propagation environment, a handover function, an authentication function, an encryption function and the like. And, the processor 420/430 can further include an encryption module configured to encrypt various messages and a timer module configured to control transmission and reception of the various messages.

The transmitting module 440/450 performs prescribed coding and modulation on a signal and/or data, which is scheduled by the processor and will be then transmitted externally, and is then able to deliver the coded and modulated signal and/or data to the antenna 400/410.

The transmitting module 450 of a mobile station transmits request for uplink resource allocation to a relay station during uplink resource request procedure. And in handover procedure, the transmitting module 450 of a mobile station transmits a message including an indication indicating whether ID the mobile station transmits is a RSID or a BSID.

The receiving module 460/470 reconstructs the radio signal received externally via the antenna 400/410 into original data in a manner of performing decoding and demodulation on the received radio signal and is then able to deliver the reconstructed original data to the processor 420/430.

The receiving module 470 of a mobile station receives a message indicating a relay station cannot allocate an uplink resource to the mobile station within a period for which the mobile station waits for a response, from the relay station.

The memory 480/490 can store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 580/590 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

Industrial Applicability

The present invention is applicable to a wireless communication system.

The invention claimed is:

1. A method of requiring an uplink resource at a mobile station in a wireless communication system including a relay station maintaining connection with the mobile station, the method comprising:
   transmitting an uplink resource allocation request for transmitting data to the relay station; and
   starting a timer for retransmitting the uplink resource allocation request when the request is transmitted to the relay station,
   receiving an uplink resource allocation delay message indicating that the relay station cannot allocate an uplink resource to the mobile station within a period of the timer for which the mobile station is configured to wait for a response to the uplink resource allocation request, from the relay station,
   wherein, if the mobile station receives the uplink resource allocation delay message, the mobile station is not configured to retransmit the uplink resource allocation request until receiving the response to the uplink resource allocation request from the relay station, regardless of termination of the timer,
   wherein the uplink resource allocation delay message is received from the relay station if the relay station cannot allocate the uplink resource from a base station or a buffer of the relay station for allocating the uplink resource is full.

2. The method of claim 1, wherein the uplink resource allocation delay message includes information about a specific time at which the relay station can allocate the uplink resource to the mobile station.

3. The method of claim 2, further comprising retransmitting the uplink resource allocation request to the relay station if the mobile station does not receive resource allocation information until the specific time.

4. A method of allocating an uplink resource at a relay station to a mobile station in a wireless communication system including the relay station maintaining connection with the mobile station, the method comprising:
   receiving an uplink resource allocation request for transmitting data to the relay station from a mobile station; and
   wherein the mobile station starts a timer for retransmitting the uplink resource allocation request when the request is transmitted to the relay station,
   transmitting, to the mobile station, an uplink resource allocation delay message indicating that the relay station cannot allocate a uplink resource to the mobile station within a period of the timer for which the mobile station is configured to wait for a response to the uplink resource allocation request, if the relay station cannot allocate the uplink resource to the mobile station within the period of the timer,
   wherein, if the relay station transmits the uplink resource allocation delay message to the mobile station, the mobile station is not configured to retransmit the uplink resource allocation request until receiving the response to the uplink resource allocation request from the relay station, regardless of termination of the timer, and
   wherein the uplink resource allocation delay message is transmitted to the mobile station if the relay station cannot allocate the uplink resource from a base station or a buffer of the relay station for allocating the uplink resource is full.

5. The method of claim 4, wherein the uplink resource allocation delay message includes information about a specific time at which the relay station can allocate the uplink resource to the mobile station.

6. A mobile station requiring an uplink resource in a wireless communication system including a relay station maintaining connection with the mobile station, comprising:
   a transmitting module transmitting an uplink resource allocation request for transmitting data to the relay station; and
   wherein the transmitting module starts a timer for retransmitting the uplink resource allocation request when the request is transmitted to the relay station,
   a receiving module receiving an uplink resource allocation delay message indicating that the relay station cannot allocate a uplink resource to the mobile station within a period of the timer for which the mobile station is configured to wait for a response to the uplink resource allocation request, from the relay station,
   wherein, if the receiving module receives the uplink resource allocation delay message, the transmitting module is not configured to retransmit the uplink resource allocation request until receiving the response to the uplink resource allocation request from the relay station, regardless of termination of the timer,
   wherein the uplink resource allocation delay message is received from the relay station if the relay station cannot allocate the uplink resource from a base station or a buffer of the relay station for allocating the uplink resource is full.

7. The mobile station of claim 6, wherein the uplink resource allocation delay message includes information about a specific time at which the relay station can allocate the uplink resource to the mobile station.

8. The mobile station of claim 7, the transmitting module retransmits the uplink resource allocation request to the relay station if the mobile station does not receive resource allocation information until the specific time.

9. A relay station maintaining connection with a mobile station requiring an uplink resource in a wireless communication system, comprising:
   a receiving module receiving an uplink resource allocation request for transmitting data to the relay station from a mobile station; and
   wherein the mobile station starts a timer for retransmitting the uplink resource allocation request when the request is transmitted to the relay station,
   a transmitting module transmitting, to the mobile station, an uplink resource allocation delay message indicating that the relay station cannot allocate a uplink resource to the mobile station within a period of the timer for which the mobile station is configured to wait for a response to the uplink resource allocation request, if the relay station cannot allocate the uplink resource to the mobile station within the period of the timer,
   wherein, if the transmitting module transmits the uplink resource allocation delay message to the mobile station, the mobile station is not configured to retransmit the uplink resource allocation request until receiving the response to the uplink resource allocation request from the transmitting module of the relay station, regardless of termination of the timer, and
   wherein the uplink resource allocation delay message is transmitted to the mobile station if the relay station cannot allocate the uplink resource from a base station or a buffer of the relay station for allocating the uplink resource is full.

10. The relay station of claim 9, wherein the uplink resource allocation delay message includes information about a time at which the relay station can allocate the uplink resource to the mobile station.

* * * * *